United States Patent [19]

Peterson

[11] 4,214,368
[45] Jul. 29, 1980

[54] DIPSTICK FOR LIQUID NITROGEN

[75] Inventor: John B. Peterson, Madison, Wis.

[73] Assignee: W. R. Grace & Co., New York, N.Y.

[21] Appl. No.: 971,642

[22] Filed: Dec. 20, 1978

[51] Int. Cl.² ............................................. G01F 23/04
[52] U.S. Cl. ................................. 33/126.7 R; 33/493; 33/494; 62/49
[58] Field of Search .............. 33/107 R, 111, 126.7 R, 33/112, 493, 494; 62/49, 127

[56] References Cited
U.S. PATENT DOCUMENTS

| | | | |
|---|---|---|---|
| 2,171,504 | 8/1939 | Keuffel et al. | 33/137 R |
| 2,622,330 | 12/1952 | Neiman | 33/112 |
| 3,006,314 | 10/1961 | Malec | 33/126.7 R X |
| 3,031,887 | 5/1962 | Weisend | 62/49 X |

FOREIGN PATENT DOCUMENTS 1015917 10/1952 France ................................ 33/126.7 R Primary Examiner—Charles E. Phillips
Attorney, Agent, or Firm—Edward J. Cabic

[57] ABSTRACT

A method for measuring with a flexible dipstick the nonvisible level of liquid nitrogen in a container. The dipstick, made of a solid plastic strip having a flat cross-section and a dark color on which is printed a visible scale, is inserted into the liquid nitrogen-containing container for a short time. The dipstick is then rapidly waved in the air to permit frost to form on the cold portion that was immersed in the liquid nitrogen. The dipstick has a relatively high width-to-thickness ratio to provide waveability and flexibility for quickly forming the frost line and for permitting compact storage when not in use.

5 Claims, 2 Drawing Figures

DIPSTICK FOR LIQUID NITROGEN

BACKGROUND OF THE INVENTION

1. The Field of the Invention

This invention relates to a plastic dipstick used to measure the depth of liquid nitrogen in a cryogenic container. More particularly, the present invention provides a flexible plastic stick which permits rapid and easy reading of a frost line to measure the depth of the liquid nitrogen.

2. Description of the Prior Art

Cryogenic containers are used to keep biological materials frozen in smaller containers with liquid nitrogen as the refrigerant. These devices are known as liquid nitrogen refrigerators and they are large metal vacuum bottles with an incredibly efficient insulation system. The key element of maintaining this efficiency is the vacuum space which is almost totally devoid of air molecules and an insulating neck tube between the inner and outer shells of the refrigerator. One type of refrigerator is made by the Linde division of Union Carbide and available from the American Breeders Service in DeForest, Wisconsin. Another type of refrigerator is sold by the Minnesota Valley Engineering in New Prague, Minnesota.

The biological material to be refrigerated is placed inside a circular container which is then inserted through the neck of the refrigerator and into the refrigerator containing the liquid nitrogen. Since liquid nitrogen has a boiling point of $-195.83°$ C. and a melting point of $-209.86°$ C., the temperature in the container is at least lower than about $-195°$ C.

These refrigerators come in various sizes and are designed for various holding periods such as, for example, four weeks, eight weeks, or sixteen weeks. However, all refrigerators eventually will fail and so one cannot be sure a given refrigerator will achieve its designated holding time between refills. Furthermore, as with any new equipment, a new refrigerator may also be faulty. Since refrigerator failures are usually unexpected and result in serious loss, it has been recommended that the level of the liquid nitrogen be measured by a dipstick each day. It is not possible to look inside the container to see the level of the liquid nitrogen since the top neck of the refrigerator usually has a small opening. Instead, dipsticks have been used which are inserted down to the bottom of the container and left for a short period of time. The portion of the stick immersed in the liquid nitrogen becomes exceedingly cold. The stick is then removed from the refrigerator and held in the surrounding atmosphere where the moisture in the air will condense and form a frost on the portion of the stick that was immersed in the liquid nitrogen.

One of the problems involved with this measuring technique is the upward movement of the front line during the period of time required for the moisture in the air to condense and form frost on the stick. While one waits for sufficient moisture in the air to transfer down and form frost on the stick, the latent heat, in the portion of the stick that was above the liquid nitrogen level, flows down to the very cold region below so the temperature in the upper region drops below 0° C. Thus the region of the stick that was above the liquid nitrogen level now becomes cold enough to cause additional moisture to freeze and form frost in this higher region. As a result, a frost line forms higher up on the stick than at the true level.

A wooden dipstick has a large amount of mass with a corresponding large amount of latent heat. When they are inserted in the liquid nitrogen they transfer their latent heat to the liquid which enhances the further evaporation of the liquid nitrogen.

Another form of dipstick used is a metal rod such as a round, black clothes hanger wire. After the frost line has formed on this rod, it is then necessary to use a ruler to measure the length of the frost portion. Similarly a thin rod made of black plastic material has been used to measure the depth of the liquid nitrogen but it also requires a separate measuring ruler to measure the length of the frost layer. Dipsticks made out of aluminum have not been found effective because aluminum is such a good conductor that is does not form a good frost line.

3. Objects of the Invention

It is an object of the present invention to provide a low mass measuring stick that can be immersed into liquid nitrogen in a cryogenic refrigerator and which permits the rapid formation of a frost line to measure the depth of the liquid nitrogen.

It is a further object of the invention to provide a flat measuring dipstick having a graduated scale thereon so the point at which the bottom of the frost line occurs can be easily measured by reading the scale on the dipstick.

It is a further object of the invention to provide a dipstick which can be rapidly contacted with a large amount of air after the dipstick is withdrawn from the liquid nitrogen-containing refrigerator so the moisture in the air can be rapidly deposited on the cold portion of the stick as frost.

It is another object of the invention to provide a measuring stick which can be made of a flexible material so that the stick can be wound up into a circular configuration to provide easy storage and handling in a small space and to have an opening at one end to permit hanging of the stick when not in use.

SUMMARY OF THE INVENTION

This invention provides a plastic measuring stick made out of a shatterproof plastic material such as a high impact styrene that has a flat cross-section with a scale printed on it so the frost line which forms on the stick can be readily measured. In the preferred embodiment, the dipstick is made of a black plastic material with a scale printed thereon in white. The stick is further characterized by having a high width-to-thickness ratio to provide great flexibility and waveability of the stick when it is held at one end. The flexibility also permits the stick to be wound up into a small circular configuration for storage and handling when not in use.

DESCRIPTION OF THE PREFERRED EMBODIMENT

Figures 1, 2:
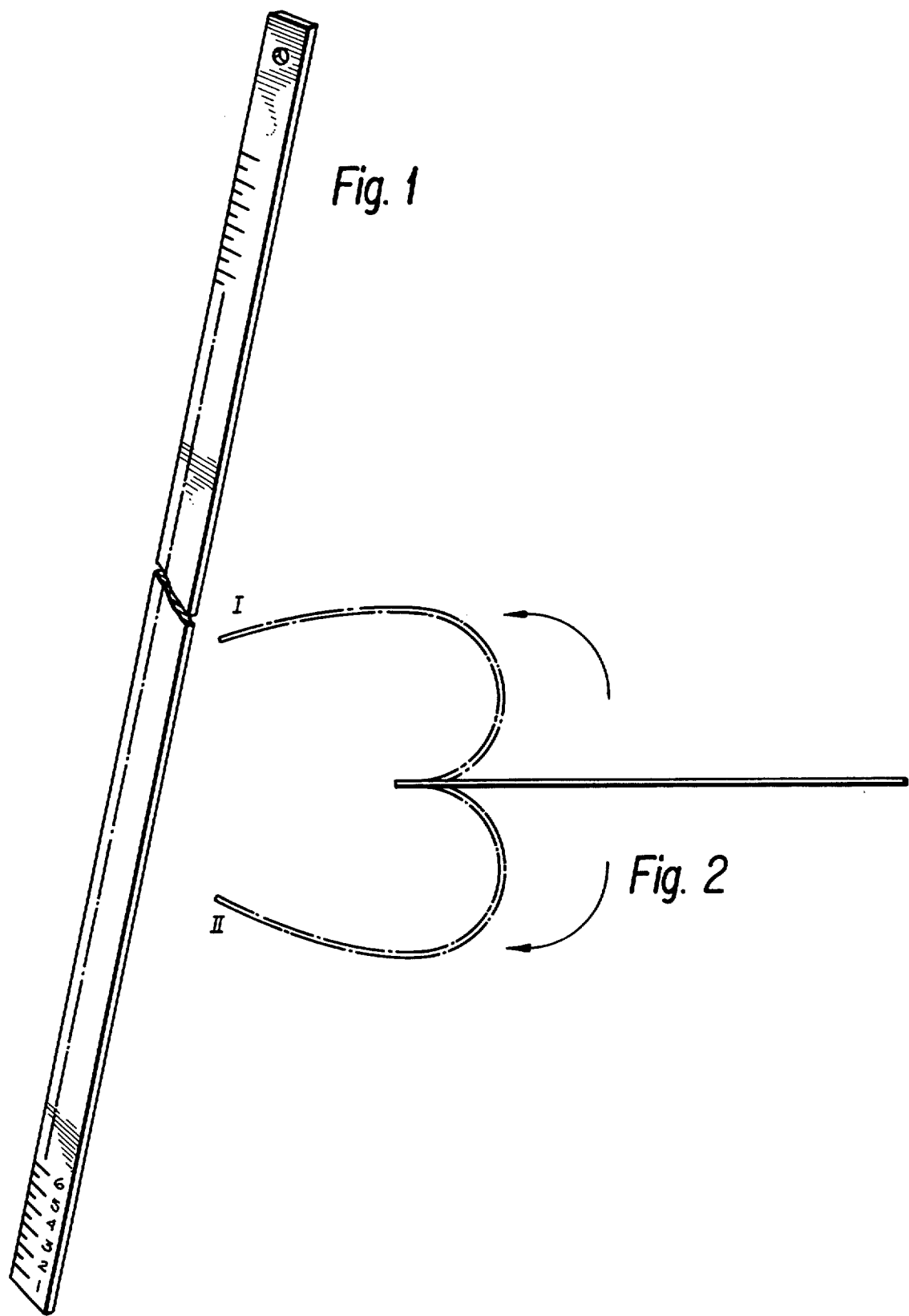
FIG. 1 is a perspective view of a dipstick according to the present invention.
FIG. 2 illustrates the stick held horizontally with the two phantom positions I and II showing the flexibility of the stick as it is normally waved or flexed when held in one hand initially at the horizontal position.

Referring to FIG. 1, the plastic dipstick shown is preferably about 24 inches long and is made of a black high impact styrene plastic with a scale printed thereon preferably in white lettering. This plastic is available from the Cadillac Plastic Corp. of Detroit, Michigan as their Cadco Black High Impact Styrene. Although inches and fractions of an inch can be printed on the stick as the scale, it is preferred that centimeters be used with a numerical label for each centimeter marking and an unlabeled line at one-half centimeter intervals.

In order to minimize the amount of plastic material to be inserted into the liquid nitrogen, the width of the dipstick is reduced to about ½ inch (1.27 cm). Any smaller width would make it difficult to read the numbers on the scale. A larger width is possible. However, even at a width of ¾ inch (1.8 cm), the front line forms a deeper U-shape at the top which is difficult to read. To obtain the desired property of being flexible, the thickness is accordingly made quite thin on the order of about 0.08 inch (2 mm). Again, the thickness could be increased to some extent, but this would increase the mass of the stick and use up more nitrogen every time a reading was taken. The thickness can be reduced a little, but the stick must not be made so flimsy that it bends when inserted on end into the refrigerator.

By using this short width and the much thinner thickness, two advantageous results are obtained. First, because there is a small mass for the dipstick, there is less latent heat transferred from the dipstick to the liquid nitrogen as each measurement is taken.

Secondly, since the dipstick is very flexible it can be waved back and forth through the air by a wrist motion as shown in FIG. 2 to quickly present a large volume of the moisture bearing atmosphere in contact with the dipstick to promote the rapid transfer of moisture from the air to the cold portion of the stick to form the frost line.

Previously nonflexible dipsticks were removed from the refrigerator and an initial thin layer of frost forms on the surface from the moisture in the air directly in contact with the stick. Additional time is required, however, for the further moisture in the air spaced from the stick to flow down in contact with the stick to form a sufficient layer of frost forming a solid line. While waiting for this thicker frost line to form, the latent heat from the upper portion of the dipstick above the liquid nitrogen level will flow into the cold portion of the dipstick so that the temperature of the surface of the upper portion drops below the frost forming temperature. As a result, the position of the frost line is continually moving up the stick.

By using the present flexible stick and waving it rapidly through the air, one quickly places the stick in contact with a significantly large amount of moisture in the air so the moisture can quickly deposit and form a frost line. This frost line is quickly visible and thus a more accurate reading corresponding to the correct liquid level of the nitrogen in the container can be ascertained.

A preferred method of using the dipstick is to remove the stopper from the refrigerator and insert the dipstick to the bottom of the refrigerator where it is left for about 8 to 10 seconds. The dipstick is not left in the refrigerator for too long a period because this can result in a false reading on the high side of the scale. For example, leaving it in up to 15 seconds raises the reading to about 0.5 cm on the high side, and longer periods will yield proportionally higher values. During this time the stick in the refrigerator is not to be touched to avoid any bending or moving of the dipstick. Then the flexible dipstick is removed from the refrigerator, and the dipstick is waved in the air for a few seconds to form a visible frost line.

As shown in FIG. 2, the stick can be held horizontally and flexed to an upward position I illustrated in phantom and then quickly flexed down to the position II also shown in the phantom. This motion is repeated rapidly to quickly form the frost.

Due to bubbles which rise around the dipstick when it is inserted in the liquid nitrogen and due to the extra bubbling on the edges, the frost line which forms has a shallow U-shape. The actual liquid level will be at the bottom of this U, and this is the level that should be recorded. Because of the contrast provided by the black background of the dipstick one can easily determine the position of the middle portion of the white frost line at its lowest level and read this value with the centimeter scale printed in white.

By taking a liquid nitrogen level reading each day, one can determine whether any significant decrease in liquid nitrogen content is taking place. Approximately 80 percent of the failures of refrigerators which have been tested are slow failures which give plenty of warning before going dry of nitrogen. By using the present dipstick, which gives accurate readings, the performance of a refrigerator can be monitored and the possibility of failure determined well in advance of the refrigerator becoming dry.

The dipstick also preferably has a hole provided at the top end so it can be hung during non-use over a small nail on a wall conveniently close to the refrigerator.

As seen in FIG. 1, the round hole can be located closely spaced to one end of the dipstick and within the width of the dipstick.

In the preferred embodiment using a high impact styrene plastic, the thickness of the dipstick is only about 2 millimeters. The advantage of a dipstick 2 millimeters thick over a dipstick of the same width having a thickness of 5 millimeters, for example, is that the 2 millimeter stick has only 40% of the mass of the 5 millimeter dipstick, which in turn means it possesses only 40% as much latent heat. When the dipstick is inserted into the liquid nitrogen it releases this latent heat as it becomes very cold. This heat warms or vaporizes the liquid nitrogen so as to reduce its cooling capacity. The thinner dipstick of this invention, therefore, uses only 40% as much nitrogen per reading. A further advantage is the shorter immersion time required. By using a thicker dipstick such as a 5 millimeter dipstick, a longer immersion time is required to remove the larger amount of latent heat to lower the temperature of the dipstick. During this time there will be continuous latent heat flowing down from the portion of the stick above the liquid level, especially around the edges. The frost line that forms on the dipstick in this instance may have a deep V-shape, which can measure 2 or more centimeters from the top to the bottom so there is no precise point on the stick to read.

What is claimed is:

1. A dipstick for measuring the level of liquid nitrogen in a container, said dipstick consisting essentially of a high impact styrene plastic material, said plastic material being such that it is inert to liquid nitrogen and it will not shatter after going from the atmosphere to exposure to liquid nitrogen for a period of time sufficient to make a measurement of the height of said liquid nitrogen in said container, said pre-determined period of time being within the range of approximately 8 to approximately 10 seconds, said plastic material being black in color, said color being selected such that the frostline formed on said dipstick by the freezing moisture in the air on said dipstick after said dipstick is dipped into said container of liquid nitrogen will be readily visible on said dipstick, said dipstick plastic material having a predetermined flexibility whereby the dipstick is highly waveable in the air to permit rapid frostline formation after said immersion in said liquid nitrogen to perform said liquid nitrogen level measurement, and said dipstick plastic being flexible to permit improved flexibility for storage of said dipstick between such uses, said dipstick being of generally flat elongated configuration having an elongated axis and having a generally rectilinear cross-sectional shape, said cross-sectional shape having a relatively high width-to-thickness ratio with a width of about ½ inch and a thickness of about 2 millimeters, with said width being measured as the long dimension of said cross-sectional shape and said thickness being measured as the short direction of said cross-sectional shape, said pre-determined width-to-thickness ratio being on the order of 6 to 1, whereby said improved flexibility for waveability in use and said improved storability between uses is enhanced, and an indicia printed in white on at least one side of said dipstick, said indicia being printed on at least one of the two surfaces of said dipstick defined by said larger width and the elongated axis of said dipstick, said indicia being oriented on said surface defined by said length and said thickness in such an orientation that the reading of said indicia corresponds to the height of the liquid nitrogen in said container, and so that upon removal of the dipstick from said liquid nitrogen and waving the dipstick in air, frost forms on the dipstick to cover those indicia values that were below the upper surface of the liquid nitrogen level whereby the indicia value at the upper surface of the frostline corresponds to the height of the liquid nitrogen in said container.

2. A dipstick according to claim 1, further comprising means in said dipstick for storing said dipstick in an unflexed axial condition between usage, said storage means comprising an opening formed in one end of said dipstick within the width of said dipstick and in closely spaced relation to said end thereof, said opening being round in cross-sectional shape.

3. A dipstick according to claim 1, wherein the scale printed thereon is a centimeter indicia with ½ centimeter graduations.

4. A method of measuring the height of liquid nitrogen in a container comprising:
 (a) moving a liquid nitrogen resistant flexible plastic dipstick having a scale printed thereon from the atmosphere into the container with one end in contact with the bottom of said container, said dipstick consisting essentially of high impact styrene plastic material, said plastic material being such that it is inert to liquid nitrogen and it will not shatter after exposure to liquid nitrogen for a period of time sufficient to make a measurement of the height of said liquid nitrogen in said container, said pre-determined period of time being within the range of approximately 8 to approximately 10 seconds, said plastic material being black in color, said color being selected such that the frostline formed on said dipstick by the freezing of moisture in the air on said dipstick after said dipstick is dipped into said container of liquid nitrogen will be readily visible on said dipstick, said dipstick plastic material having a pre-determined flexibility whereby the dipstick is highly waveable in the air to permit rapid frostline formation after said immersion in said liquid nitrogen to perform said liquid nitrogen level measurement, and said dipstick plastic being flexible to permit improved flexibility for storage of said dipstick between such uses, said dipstick being of generally flat elongated configuration having an elongated axis and having a generally rectilinear cross-sectional shape, said cross-sectional shape having a relatively high width-to-thickness ratio with a width of about ½ inch and a thickness of about 2 millimeters, with said width being measured as the long dimension of said cross-sectional shape and said thickness being measured as the short direction of said cross-sectional shape, said predetermined width-to-thickness ratio being on the order of 6 to 1, whereby said improved flexibility for waveability in use and said improved storability between uses is enhanced, and an indicia printed in white on at least one side of said dipstick, said indicia being printed on at least one of the two surfaces of said dipstick defined by said larger width and the elongated axis of said dipstick, said indicia being oriented on said surface defined by said length and said thickness in such an orientation that the reading of said indicia corresponds to the height of the liquid nitrogen in said container, and so that upon removal of the dipstick from said liquid nitrogen and waving the dipstick in air, frost forms on the dipstick to cover those indicia values that were below the upper surface of the liquid nitrogen level whereby the indicia value at the upper surface of the frostline corresponds to the height of the liquid nitrogen in said container.
 (b) maintaining the dipstick in the container for a short period of time,
 (c) removing the dipstick and waving it in air to rapidly form a frostline of solidified moisture on the surface of the dipstick, and
 (d) reading the level of the frostline on the scale to determine the corresponding liquid nitrogen level.

5. A method according to claim 4, wherein the scale printed thereon is a centimeter scale with one-half centimeter graduations.

* * * * *